United States Patent [19]
Atzinger

[11] 3,895,387
[45] July 15, 1975

[54] VIBRATION DE-COUPLER FOR USE WITH RECORDING SYSTEMS

[75] Inventor: Wolfgang Atzinger, Munich, Germany

[73] Assignee: Fritz Schwarzer GmbH, Munich, Germany

[22] Filed: Mar. 22, 1974

[21] Appl. No.: 453,611

[52] U.S. Cl. .............................. 346/32; 346/139 C
[51] Int. Cl. ..................... G01d 3/06; G01d 11/10
[58] Field of Search ..................... 346/31, 32, 139 C

[56] References Cited
UNITED STATES PATENTS
3,163,491  12/1964  Daigler...................... 346/139 C X
3,392,402  7/1968  Hartai................................. 346/31

Primary Examiner—Joseph W. Hartary
Attorney, Agent, or Firm—Joel Wall; William C. Nealon; H. R. Berkenstock, Jr.

[57] ABSTRACT

A system for recording input electrical signals by positioning galvanometer pen styli on chart paper in accordance with the input signals. Each pen is mechanically linked to an optical mask. The optical mask in conjunction with an optical system provides a feedback light signal, which is converted to a feedback electrical signal for nulling the input signal. The de-coupler is a vibration-absorbing arm or sleeve which inhibits transmission of extraneous vibrational motion of the writing end or tip of the styli, back to the optical feedback system, thereby preventing oscillatory disturbances in the system.

2 Claims, 2 Drawing Figures

3,895,387

VIBRATION DE-COUPLER FOR USE WITH RECORDING SYSTEMS

BACKGROUND OF THE INVENTION

1. Field of the Invention

The present invention relates generally to electrical signal recording systems. In particular, the present invention relates to such systems utilizing a remote-position indicator with vibration de-coupled electrical-optical feedback in the recording of signals on chart paper.

2. Description of Prior Art

In known or prior art remote-position indicators, or systems for recording electrical signals, inductive receivers (transducers), bridge wire-receivers, slip-ring receivers, capacitive receivers, magnetically operated receivers are provided. Some of these receivers may be adapted for use with shaft mounted, lightcoupled, position feedback systems.

In such types of remote-position indicators, transmission efficiency of the position message is a function of transition of the control signal from a mechanical into an electromagnetic value. In inductive receivers, the difficulty or problem exists that transmission efficiency can be impaired through an axle mounting (bearing) of the rotational system, through magnetic inhomogeneities of transformer material, as well as through mechanical machining efficiency of slot sides in the yoke aperture.

In resistance or potentiometer receivers, contact difficulties can arise between receiver and sliding track, as a consequence of soiling or rusting of conducting material. Cleaning, calibrating and gauging is usually frequently repeated and the slide (pilot) wire has to be frequently changed.

Capacitive remote-position indicators employ AC voltages and require adequate shielding of individual receivers, in order to avoid mutual interference of parallel channels and other outward disturbances. Operational voltage and operational frequency should be kept constant. Other remote-position indicators, have other problems.

Certain more advanced remote-position indicator systems, as noted, employ electro-optic position feedback stabilization having high sensitivity. These systems generally provide superior performance. But, in certain cases, the feedback system, being operatively connected to a driving axis of the recording pen may be sensitive to extraneous vibrations of the scribing device. If vibrations occur at a resonant frequency of the pen stylus they may be therefore quite large. The system may amplify these vibrations causing increased rather than diminished system error. The present invention provides a solution generally to these prior art problems, and in particular to the extraneous vibration feedback problem.

SUMMARY OF THE INVENTION

A system for recording electrical signals includes an amplifier for amplifying the signals, a galvanometer pen device for scribing representations of the signals on chart paper, the device being responsive to signal output from the amplifier. The galvanometer pen device includes at least one stylus assembly having a writing end or scribing tip, a rotatably mounted end, and a decoupling or damping sleeve connecting the two ends. The sleeve prevents extraneous vibration of the writing tip, resulting partially from scribing motion of the tip, from being transmitted back to the rotatably mounted end, and in turn to the sensitive light position-feedback system. An advantage of the present invention is that it provides more accurate measurement and recording of signals of interest.

It is thus an object of the present invention to provide an improved signal recording system.

It is another object of the present invention to provide an improved recording system which employs light coupled positionfeedback and extraneous penvibration de-coupling.

Other objects and advantages of the present invention will become apparent to one having reasonable skill in the art after referring to the detailed description of the appended drawings wherein:

DESCRIPTION OF THE PREFERRED EMBODIMENTS

The present invention relates to subject matter disclosed and claimed in U.S. Pat. application Ser. No. 440,884 filed Feb. 8, 1974, in the name of Wolfgang Atzinger et al, and assigned to the assignee of the present invention. Subject matter disclosed in the above application is incorporated herein by reference.

Figure 1:
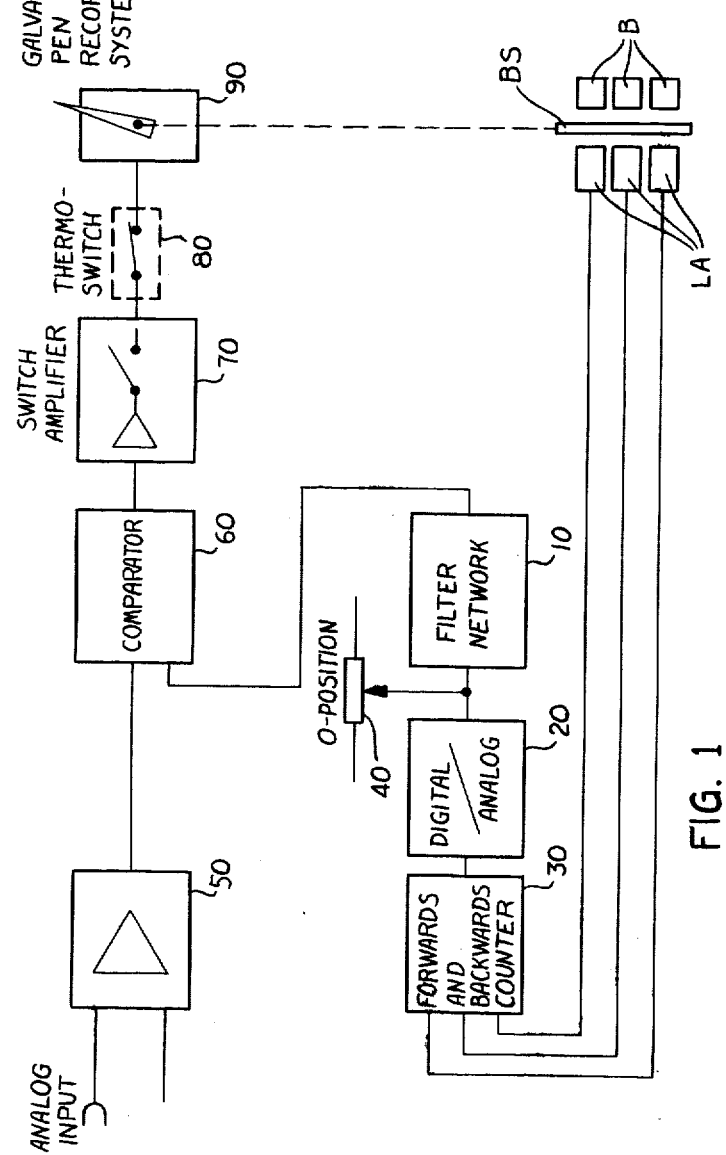
FIG. 1 depicts a diagrammatic representation of a remoteposition indicator and recording system according to the invention, as well as a block diagram illustration of the electrical circuit coordinated with it.

In FIG. 1, forward-backward counter 30 provides digital input to D/A converter 20. Analog output from converter 20 can be zero-adjusted by control 40 and it is conducted to filter network 10. Output of filter network 10 is conducted to one input of comparator 60. Input of comparator 60 is conducted from amplifier 50. Input to amplifier 50 is the electrical input signal to be recorded. Output from comparator 60 is conducted to switch amplifier 70, the output of which drives galvanometer pen system or recording system 90 through thermo-switch (circuit breaker) 80, in a switching or pulsing manner.

The exemplification of a remote-position indicator demonstrated in FIG. 1, according to the present invention, contains diaphragm segment BS, which is stationarily attached with the axis of the recording system, to which the recording indicator or pointer of the recording system is likewise attached. On one side of the diaphragm segment, an illuminating device B is stationarily attached, and on the other side, a light receiver LA. As an illumination device, luminous diodes are preferably used, and as light receivers, phototransistors. Luminous or light-emitting diodes and phototransistors are standard components, well known in the electronics arts. Further explanation thereof is not necessary for complete understanding of the present invention.

Figure 2:
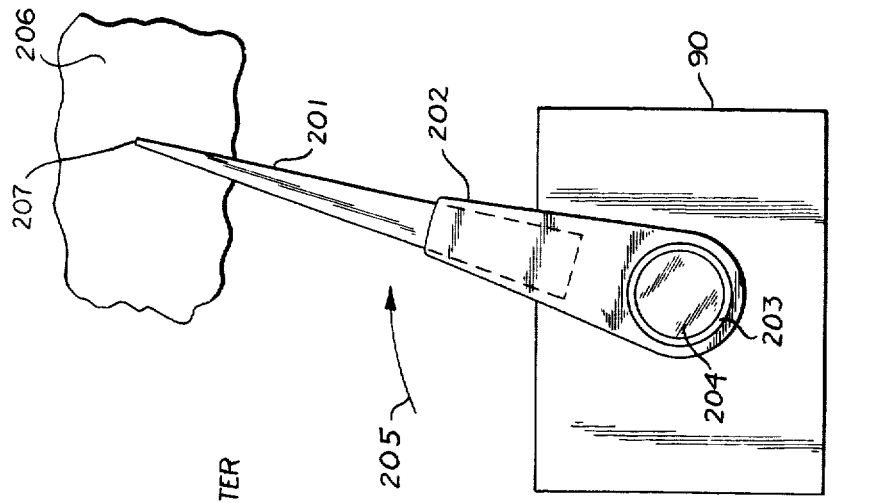
FIG. 2 depicts the galvanometer pen assembly of FIG. 1 in greater detail.

Referring to FIG. 2, galvanometer pen system or recording system 90 is shown supporting galvanometer stylus assembly 205. Assembly 205 comprises writing end 201, absorbing sleeve 202, and rotatably-mounted end or cylinder 203. More specifically, vibration damping or absorbing sleeve 202, which may be constructed from materials such as polyurethane, or other plastics, is fixedly mounted about rotatably mounted cylinder 203. Cylinder 203 is operatively connected to shaft 204. Shaft 204 is coupled to pen system 90, in turn being coupled to the light feedback system. Writing end 201 may be constructed from metals such as strip steel or titanium, and may be constructed from plastic. Writing end 201 is fixedly mounted within sleeve or arm 202. Scribing tip 207 makes contact with chart paper 206 to record the electrical signals of interest.

The selection of composition material for sleeve 202 is important. The vibration absorption or damping property or characteristic associated with sleeve 202 effectively inhibits unwanted vibrational motion of scribing tip 201 from being transmitted back to the light feedback system via rotatable cylinder 203.

The invention may be embodied in yet other specific forms without the departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency are therefore intended to be embraced therein.

What is claimed is:

1. A system for recording at least one electrical signal said system comprising means for amplifying said signal thereby generating an amplified signal, means for applying said electrical signal to an input of said amplifying means, electro-mechanical means for registering the output of said amplifying means, said electro-mechanical means including chart paper means and galvanometer pen means for scribing a representation of said electrical signal on said chart paper means, optical feedback means mechanically connected to said galvanometer pen means and responsive to operation of said electro-mechanical means for generating a feedback light signal related to amplitude of said electrical signal, means for detecting said light signal and for converting said feedback light signal to a feedback electrical signal, said amplifying means including means for comparing said feedback electrical signal and said amplified signal for generating said output of said amplifying means, said galvanometer pen means including a galvanometer stylus assembly having a scribing tip, a rotatably mounted end, vibration-absorbing sleeve means connecting said tip and said end said tip being fixedly mounted within said sleeve for inhibiting transmission of extraneous vibrational motion of said scribing tip to said optical feedback means, and means for rotatably supporting said stylus assembly at said rotatably mounted end.

2. A system as recited in claim 1 and wherein said sleeve is constructed from polyurethane and said tip is constructed from spring steel.

* * * * *